July 10, 1962    C. E. McCORMICK    3,043,585
DEVICE FOR SPACING THE CONVOLUTIONS OF A COILED WIRE
Filed May 11, 1960    2 Sheets-Sheet 1

INVENTOR.
CLARENCE E. McCORMICK
BY
*W. B. Harpman*
ATTORNEY

July 10, 1962 C. E. McCORMICK 3,043,585
DEVICE FOR SPACING THE CONVOLUTIONS OF A COILED WIRE
Filed May 11, 1960 2 Sheets-Sheet 2

INVENTOR.
CLARENCE E. McCORMICK
BY W.B.Harpman
ATTORNEY

United States Patent Office 3,043,585
Patented July 10, 1962

3,043,585
DEVICE FOR SPACING THE CONVOLUTIONS OF A COILED WIRE
Clarence Everett McCormick, Poland, Ohio, assignor to Lee Rubber & Tire Corporation, Youngstown, Ohio, a corporation of New York
Filed May 11, 1960, Ser. No. 28,272
6 Claims. (Cl. 269—22)

This invention relates to a device used in the production of reinforced plastic vacuum hose and more particularly to a device for receiving a coil of reinforcing wire and spacing the individual convolutions thereof uniformly with respect to one another.

A further object of the invention is the provision of a simple and easily operated device for receiving an elongated coil of reinforcing wire and spacing the convolutions thereof evenly throughout the length thereof.

A further object of the invention is the provision of a device for receiving a coil of reinforcing wire and spacing the convolutions thereof with respect to one another and holding the coil of wire while a mandrel is inserted longitudinally therethrough.

A still further object of the invention is the provision of a device for receiving and holding a coil of reinforcing wire with the helices thereof in spaced relation throughout the length of the coil and wherein the device provides sliding areas within the helices in the coil to carry a mandrel in spaced relation to the coil.

The device for spacing the convolutions of a coil of reinforcing wire as disclosed herein is particularly useful in the formation of wire reinforced plastic vacuum hose wherein the tubular sheath of the hose is secured to and supported by a spirally wound coated reinforcing wire taking the form of a longitudinal coil, the individual convolutions of which are precisely spaced with respect to one another so that the plastic sheath of the finished vacuum hose extends uniformly between the convolutions of the reinforcing wire coil. The reinforced plastic vacuum hose formed with the reinforcing wire in individual uniformly spaced convolutions longitudinally of the coil thereof provides the necessary flexibility in the hose as it permits the convolutions of the coil to stretch longitudinally therebetween.

In forming elongated coils or reinforcing wire such as used in plastic vacuum hose, it is desirable that the individual convolutions of the wire coil be uniformly and evenly spaced with respect to one another longitudinally of the coil and it is equally desirable that the uniform spacing of the individual convolutions of the elongated coil be maintained throughout the formation of the vacuum hose.

The present invention relates to a device for quickly and easily spacing the individual convolutions of a reinforcing wire coil and holding the same and forming guides to receive a mandrel inserted through said coil and wherein the possibility of the mandrel engaging the coil and displace the individual convolutions is completely eliminated.

With the foregoing and other objects in a view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
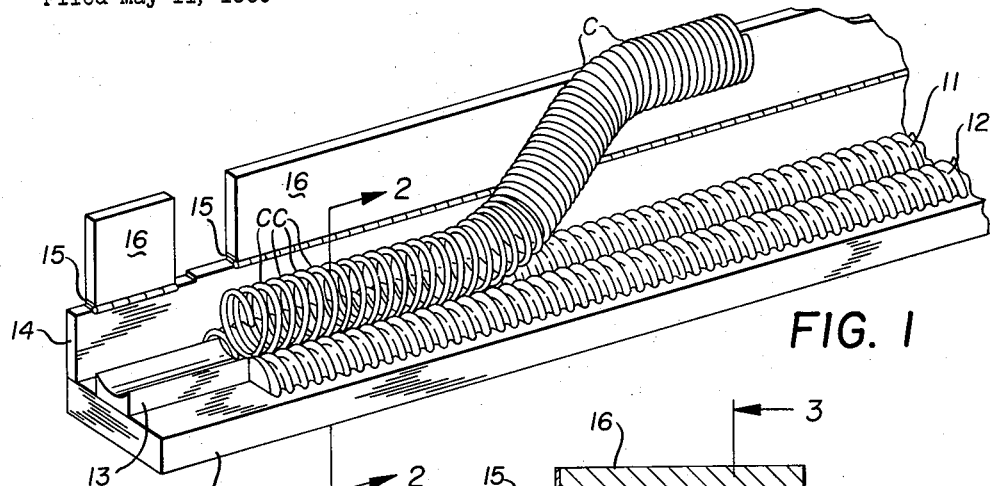
FIGURE 1 is a perspective view of a portion of the device for uniformly spacing the individual convolutions of a coil of reinforcing wire.

By referring to the drawings and FIGURE 1 in particular it will be seen that the device for spacing the individual convolutions of a reinforcing wire coil comprises a base 10 which is relatively long and narrow. A pair of spaced longitudinally extending half circular threaded rods 11 and 12 are mounted on the base and may conveniently comprise half sections of a round rod having a continuous thread pattern formed thereon. Alternately, a pair of cross sectionally, round threaded rods may be mounted side by side on the base or a pair of coil springs may be employed. The preferred construction, however, is that illustrated and described herein and it will be seen that the half threaded rod sections 11 and 12 are displaced longitudinally sufficiently that a righthand thread pattern formed on the half rod 11 diagonally matches the righthand thread pattern formed on the half threaded rod 12. Thus, a coil of wire C positioned between threaded half rods 11 and 12 may be readily positioned with the individual convolutions thereof extending in a lefthand spiral crossways of the half threaded rods 11 and 12 and resting in the valleys of the threads, the individual convolutions being indicated by the letters CC. A transversely arcuate member 13 is positioned on the base 10 at each end of the threaded half rods 11 and 12 and in axial alignment with the area between the same. A vertical support 14 is positioned at one side of the base 10 and hinges 15, 15 are secured thereto and to clamping members 16, 16. The hinges 15, 15 permit the clamping members 16, 16 to be moved to horizontal position as shown in FIGURES 2 and 3 and 4 of the drawings wherein the clamping members 16, 16 are shown holding a properly spaced coil C comprising a plurality of individually spaced convolutions CC.

Figure 2:
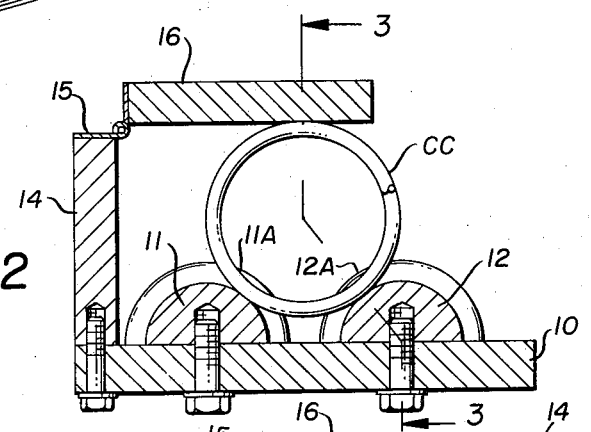
FIGURE 2 is an enlarged vertical section on line 2—2 of FIGURE 1.
Figure 3:
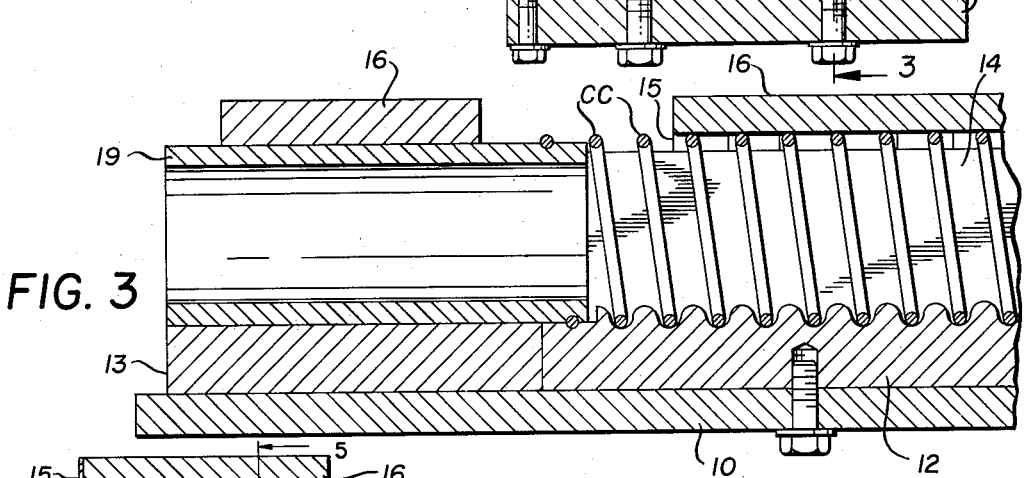
FIGURE 3 is an enlarged vertical section on line 3—3 of FIGURE 2.
Figure 4:
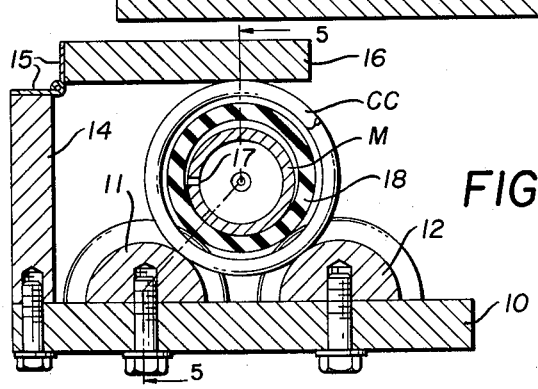
FIGURE 4 is a cross section of the device shown in FIGURES 1, 2 and 3 and illustrating a tubular mandrel having an inflatable rubber tube thereon positioned in a reinforcing wire coil on the device.
Figure 5:
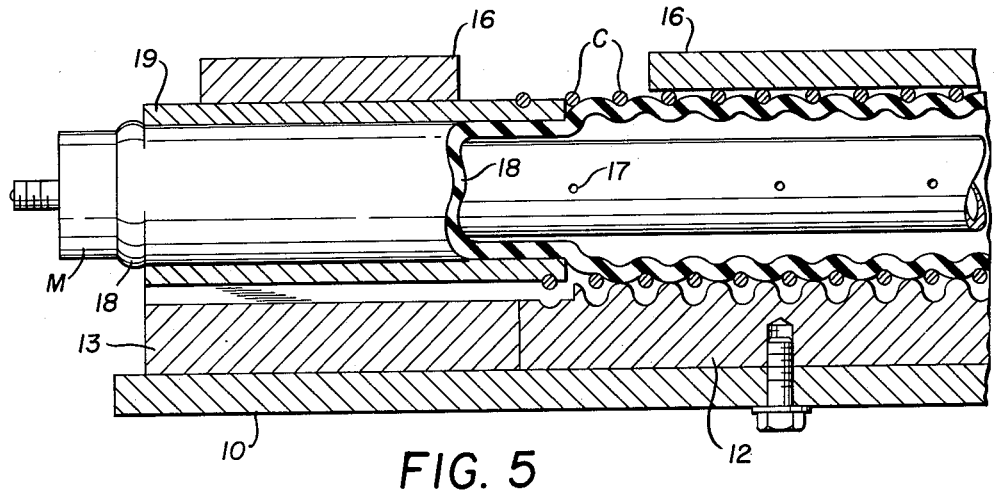
FIGURE 5 is a vertical view on line 5—5 of FIGURE 4.

Still referring to the drawings and FIGURES 2 and 4 in particular it will be observed that the thread patterns on the threaded half rods 11 and 12 are relatively deep so that the individual ribs of the threads are of greater height than the diameter of the reinforcing wire coil positioned thereon. Thus guiding surfaces 11A and 12A are formed which extend within the diameter of the coil C and the convolutions CC thereof and which guiding surfaces 11A and 12A facilitate the longitudinal insertion of a mandrel M (as seen in FIGURES 4 and 5 of the drawings) within the coil C and the individual convolutions CC thereof. As will be understood by those skilled in the art, the mandrel M is of tubular steel construction having closed ends with an air valve in one end so that compressed air may be introduced thereinto. Openings 17 in the mandrel M permit such compressed air to inflate a rubber tube 18 mounted on the mandrel M and having its ends secured thereto. In FIGURE 4 of the drawings the mandrel M with its rubber tube in deflated position is shown in position in the individual convolutions CC of the reinforcing wire coil C which is positioned on the threaded half rods 11 and 12 and held by one of the clamping members 16. It will be observed that the mandrel M with its inflatable rubber tube 18 is supported in spaced relation to the individual convolutions CC of the coil C by the guide surfaces 11A and 12A of the threaded half rods 11 and 12.

By referring now to FIGURE 5 of the drawings it will be observed that the rubber tube 18 on the mandrel M has been inflated and has moved outwardly against the convolutions of the coil C of reinforcing wire. The clamping member 16 may be then moved away and the mandrel M with its properly spaced reinforcing wire coil may be removed and further processed as by the formation of the plastic sheath thereon.

It will thus be seen that a relatively simple and efficient device has been disclosed which may be easily and conveniently used for spacing the individual convolutions of a reinforcing wire coil. Those skilled in the art will understand that the ends of the reinforcing wire coil are temporarily secured to tubular members 19 which are positioned on the transversely arcuate members 13 and held thereon by the registering clamping members 16, 16 to facilitate the positioning and elongation of the coil C on the device.

It will be seen that a device for uniformly spacing the individual convolutions of a coiled wire has been disclosed which meets the several objects of the invention and having thus described my invention, what I claim is:

1. A device for evenly supporting and spacing the convolutions of a coiled wire relative to one another and relative to an axial center line extending through the convolutions of said coiled wire and comprising a pair of elongated externally threaded members positioned in horizontally spaced parallel relation to one another longitudinally of said device and arranged to form continuous spaced supports for a coiled wire positioned thereon, an elongated clamping member movably mounted on said device and arranged to be moved into horizontal contact with said coiled wire positioned on said threaded members.

2. A device for spacing the convolutions of a coiled wire as set forth in claim 1 and wherein the externally threaded members comprise longitudinal half sections of an externally threaded rod cut longitudinally.

3. The device for spacing the convolutions of a coiled wire set forth in claim 1 and wherein the threaded members comprise externally threaded rods.

4. The device for spacing the convolutions of a coiled wire set forth in claim 1 and wherein the threaded members are offset longitudinally for diagonal alignment with the convolutions of said coiled wire.

5. A device for uniformly supporting and spacing the convolutions of a coil of reinforcing wire and positioning and supporting an elongated mandrel within said coil of reinforcing wire in spaced relation thereto and comprising a support base, a pair of horizontally disposed spaced parallel members supported by said support base each of said parallel members having a relatively deep continuous thread pattern formed on their outermost and uppermost surfaces defining spiral ribs and valleys, the thread patterns being in diagonal alignment with one another and arranged to receive said coil of wire thereon with the convolutions of said coil of wire lying completely in the valleys of said thread patterns and individually spaced by the ribs of said thread patterns and a clamping member comprising an elongated device hinged to said support and movable into a position above said threaded members for engagement with said coiled wire positioned on said threaded members for holding the same in position thereon, said elongated mandrel being positioned on and supported by said ribs of said thread patterns.

6. The device for spacing the convolutions of a coiled wire as set forth in claim 5 and wherein the valleys of the thread patterns on the threaded members are relatively deeper than the diameter of the wire forming the coil positioned thereon whereby the ribs of the said thread patterns extend into the area defined by said coiled wire and form supporting guides receiving and holding said mandrel inserted longitudinally in said coiled wire.

References Cited in the file of this patent

UNITED STATES PATENTS

| | | |
|---|---|---|
| 1,817,877 | Cawley | Aug. 4, 1931 |
| 2,158,229 | Goldthwaite | May 16, 1939 |
| 2,299,505 | Shaffer | Oct. 20, 1942 |
| 2,832,122 | Espari et al. | Apr. 29, 1958 |
| 2,943,336 | Barrett et al. | July 5, 1960 |